(12) United States Patent
Sudi

(10) Patent No.: US 11,685,631 B2
(45) Date of Patent: Jun. 27, 2023

(54) VIDEO ANALYTICS BASED ADVANCED ELEVATOR DISPATCHING

(71) Applicant: Otis Elevator Company, Farmington, CT (US)

(72) Inventor: Sandeep Sudi, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1062 days.

(21) Appl. No.: 16/427,967

(22) Filed: May 31, 2019

(65) Prior Publication Data

US 2020/0377330 A1    Dec. 3, 2020

(51) Int. Cl.
*B66B 1/24* (2006.01)
*G06V 40/10* (2022.01)

(52) U.S. Cl.
CPC .......... *B66B 1/2408* (2013.01); *G06V 40/103* (2022.01); *B66B 2201/222* (2013.01); *B66B 2201/243* (2013.01)

(58) Field of Classification Search
CPC ............ B66B 1/2408; B66B 2201/222; B66B 2201/243; B66B 2201/103; B66B 5/0012; B66B 1/28; B66B 1/3423; B66B 1/3446; B66B 5/0018; G06V 40/103
See application file for complete search history.

(56) References Cited

U.S. PATENT DOCUMENTS

2007/0272493 A1  11/2007  Legez
2012/0305341 A1  12/2012  Kuoppala et al.
2018/0237256 A1 *  8/2018  Yamada ................. G05B 17/02
2019/0389688 A1 * 12/2019  Stanley .................... B66B 1/28
2020/0307950 A1 * 10/2020  Sudi ....................... B66B 1/468

FOREIGN PATENT DOCUMENTS

JP    H08175768 A    7/1996

OTHER PUBLICATIONS

Author Unknown, "Technology and Application of Intelligent Elevator Engineering Control System", English Abstract, May 31, 2017; 2 Pages.
Chinese Office Action for Application No. 201911418944.X; dated Jan. 29, 2022; 17 Pages.
Extended European Search Report Application No. 19217703.8-1017; dated Jul. 23, 2020; 7 pages.

\* cited by examiner

*Primary Examiner* — Jeffrey Donels
(74) *Attorney, Agent, or Firm* — Cantor Colburn LLP

(57) ABSTRACT

A method of operating a building elevator system having a plurality of elevator systems organized into an elevator group including: detecting crowd data within an elevator lobby proximate the elevator group on a landing; determining a level of crowdedness in response to the crowd data; determining at least two elevator cars of the plurality of elevator systems are required in response to the level of crowdedness; dispatching an elevator car of a first elevator system of the plurality of elevator systems to the landing; dispatching an elevator car of a second elevator system of the plurality of elevator systems to the landing; and coordinating an arrival time of the elevator car of the first elevator system at the landing and an arrival time of the elevator car of the second elevator system at the landing.

20 Claims, 3 Drawing Sheets

VIDEO ANALYTICS BASED ADVANCED ELEVATOR DISPATCHING

BACKGROUND

The subject matter disclosed herein relates generally to the field of elevator systems, and specifically to a method and apparatus for coordinating the operation of multiple elevator cars.

Commonly, elevator cars are organized into an elevator group (i.e., and elevator bank) that serves an elevator lobby. Passengers that desire to call an elevator car must press an elevator call button to call a first elevator car. The elevator call button remains illuminated until the first elevator car arrives, which prevents further elevator calls from being place. Thus, if a large crowd is located in the elevator lobby, additional passenger must wait for the first elevator car called to arrive prior to calling an additional elevator car, which may lead to increased wait times for large crowds at in elevator lobbies.

BRIEF SUMMARY

According to an embodiment, a method of operating a building elevator system having a plurality of elevator systems organized into an elevator group is provided. The method including: detecting crowd data within an elevator lobby proximate the elevator group on a landing; determining a level of crowdedness in response to the crowd data; determining at least two elevator cars of the plurality of elevator systems are required in response to the level of crowdedness; dispatching an elevator car of a first elevator system of the plurality of elevator systems to the landing; dispatching an elevator car of a second elevator system of the plurality of elevator systems to the landing; and coordinating an arrival time of the elevator car of the first elevator system at the landing and an arrival time of the elevator car of the second elevator system at the landing.

In addition to one or more of the features described herein, or as an alternative, further embodiments may include adjusting at least one of a velocity of the elevator car of the first elevator system and a velocity of the elevator car of the second elevator system.

In addition to one or more of the features described herein, or as an alternative, further embodiments may include that prior to dispatching the elevator car of the first elevator system and the elevator car of the second elevator system, the method further includes: determining the elevator car of the first elevator system is proximate the elevator car of the second elevator system.

In addition to one or more of the features described herein, or as an alternative, further embodiments may include that prior to dispatching the elevator car of the first elevator system and the elevator car of the second elevator system, the method further includes: determining the elevator car of the first elevator system and the elevator car of the second elevator system are proximate the landing.

In addition to one or more of the features described herein, or as an alternative, further embodiments may include adjusting at least one of a dispatch time of the elevator car of the first elevator system and a dispatch time of the elevator car of the second elevator system.

In addition to one or more of the features described herein, or as an alternative, further embodiments may include that the arrival time of the elevator car of the first elevator system at the landing is equivalent to the arrival time of the elevator car of the second elevator system at the landing.

In addition to one or more of the features described herein, or as an alternative, further embodiments may include that the crowd data includes a location of individuals within an elevator lobby, and wherein the arrival time of the elevator car of the first elevator system at the landing and the arrival time of the elevator car of the second elevator system at the landing are coordinated in response to the location of individuals within the elevator lobby.

In addition to one or more of the features described herein, or as an alternative, further embodiments may include that the arrival time of the elevator car of the first elevator system at the landing is before the arrival time of the elevator car of the second elevator system at the landing.

In addition to one or more of the features described herein, or as an alternative, further embodiments may include that the arrival time of the elevator car of the first elevator system at the landing is after the arrival time of the elevator car of the second elevator system at the landing.

In addition to one or more of the features described herein, or as an alternative, further embodiments may include displaying the arrival time of the elevator car of the first elevator system at the landing on a display device located on the landing; and displaying the arrival time of the elevator car of the second elevator system at the landing on a second display device located on the landing.

According to another embodiment, a building elevator system having a plurality of elevator systems organized into an elevator group is provided. The building elevator system including: a processor; a memory including computer-executable instructions that, when executed by the processor, cause the processor to perform operations, the operations including: detecting crowd data within an elevator lobby proximate the elevator group on a landing; determining a level of crowdedness in response to the crowd data; determining at least two elevator cars of the plurality of elevator systems are required in response to the level of crowdedness; dispatching an elevator car of a first elevator system of the plurality of elevator systems to the landing; dispatching an elevator car of a second elevator system of the plurality of elevator systems to the landing; and coordinating an arrival time of the elevator car of the first elevator system at the landing and an arrival time of the elevator car of the second elevator system at the landing.

In addition to one or more of the features described herein, or as an alternative, further embodiments may include that the operations further include: adjusting at least one of a velocity of the elevator car of the first elevator system and a velocity of the elevator car of the second elevator system.

In addition to one or more of the features described herein, or as an alternative, further embodiments may include that prior to dispatching the elevator car of the first elevator system and the elevator car of the second elevator system, the operations further includes: determining the elevator car of the first elevator system is proximate the elevator car of the second elevator system.

In addition to one or more of the features described herein, or as an alternative, further embodiments may include that prior to dispatching the elevator car of the first elevator system and the elevator car of the second elevator system, the operations further includes: determining the elevator car of the first elevator system and the elevator car of the second elevator system are proximate the landing.

In addition to one or more of the features described herein, or as an alternative, further embodiments may include that the operations further include: adjusting at least one of a dispatch time of the elevator car of the first elevator system and a dispatch time of the elevator car of the second elevator system.

In addition to one or more of the features described herein, or as an alternative, further embodiments may include that the arrival time of the elevator car of the first elevator system at the landing is equivalent to the arrival time of the elevator car of the second elevator system at the landing.

In addition to one or more of the features described herein, or as an alternative, further embodiments may include that the crowd data includes a location of individuals within an elevator lobby, and wherein the arrival time of the elevator car of the first elevator system at the landing and the arrival time of the elevator car of the second elevator system at the landing are coordinated in response to the location of individuals within the elevator lobby.

In addition to one or more of the features described herein, or as an alternative, further embodiments may include that the arrival time of the elevator car of the first elevator system at the landing is before the arrival time of the elevator car of the second elevator system at the landing.

In addition to one or more of the features described herein, or as an alternative, further embodiments may include that the arrival time of the elevator car of the first elevator system at the landing is after the arrival time of the elevator car of the second elevator system at the landing.

In addition to one or more of the features described herein, or as an alternative, further embodiments may include that the operations further include: displaying the arrival time of the elevator car of the first elevator system at the landing on a display device located on the landing; and displaying the arrival time of the elevator car of the second elevator system at the landing on a second display device located on the landing.

Technical effects of embodiments of the present disclosure include utilizing a crowd detection device to call multiple elevator cars in response to a level of crowdedness detected.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
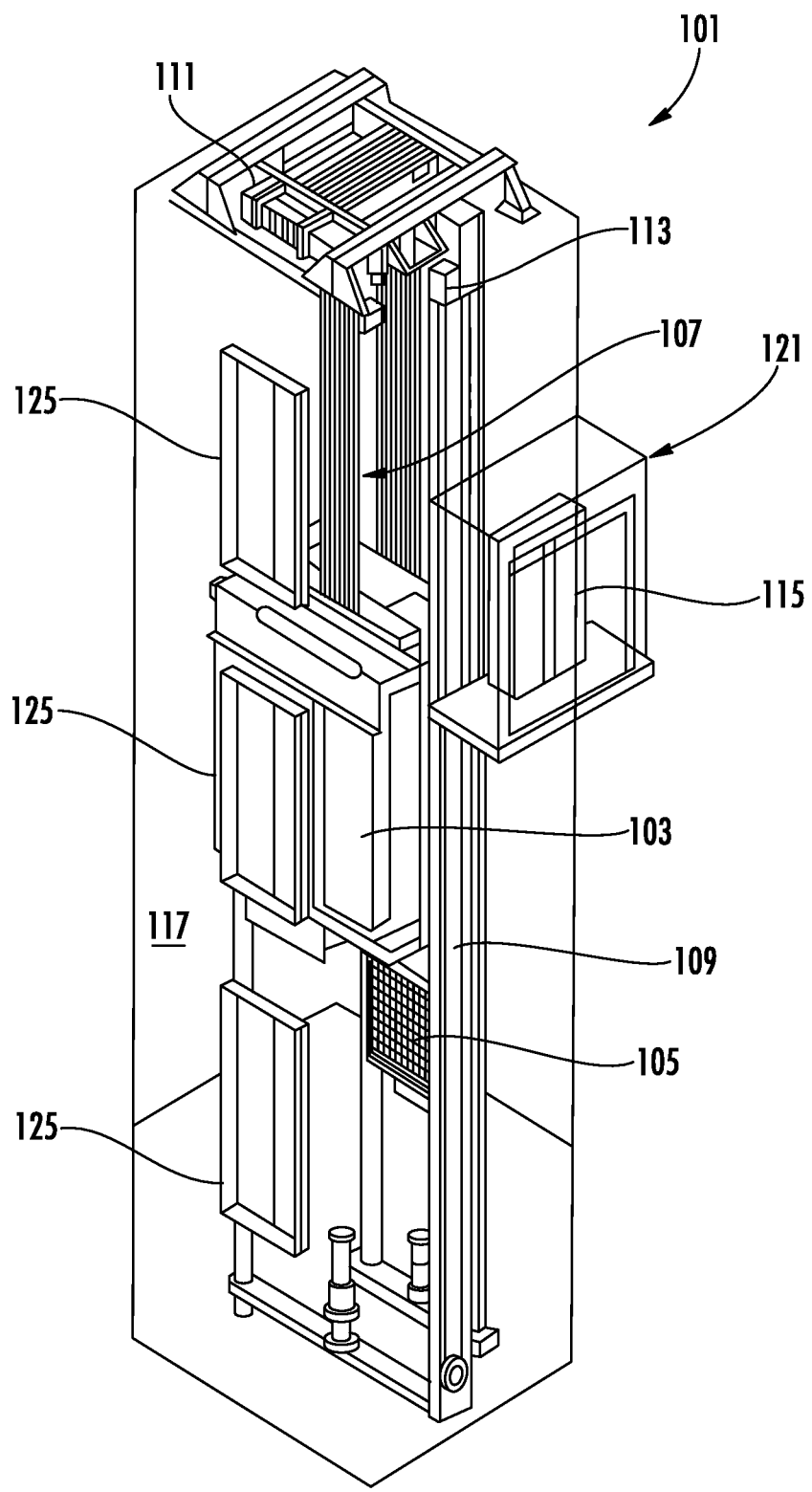
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
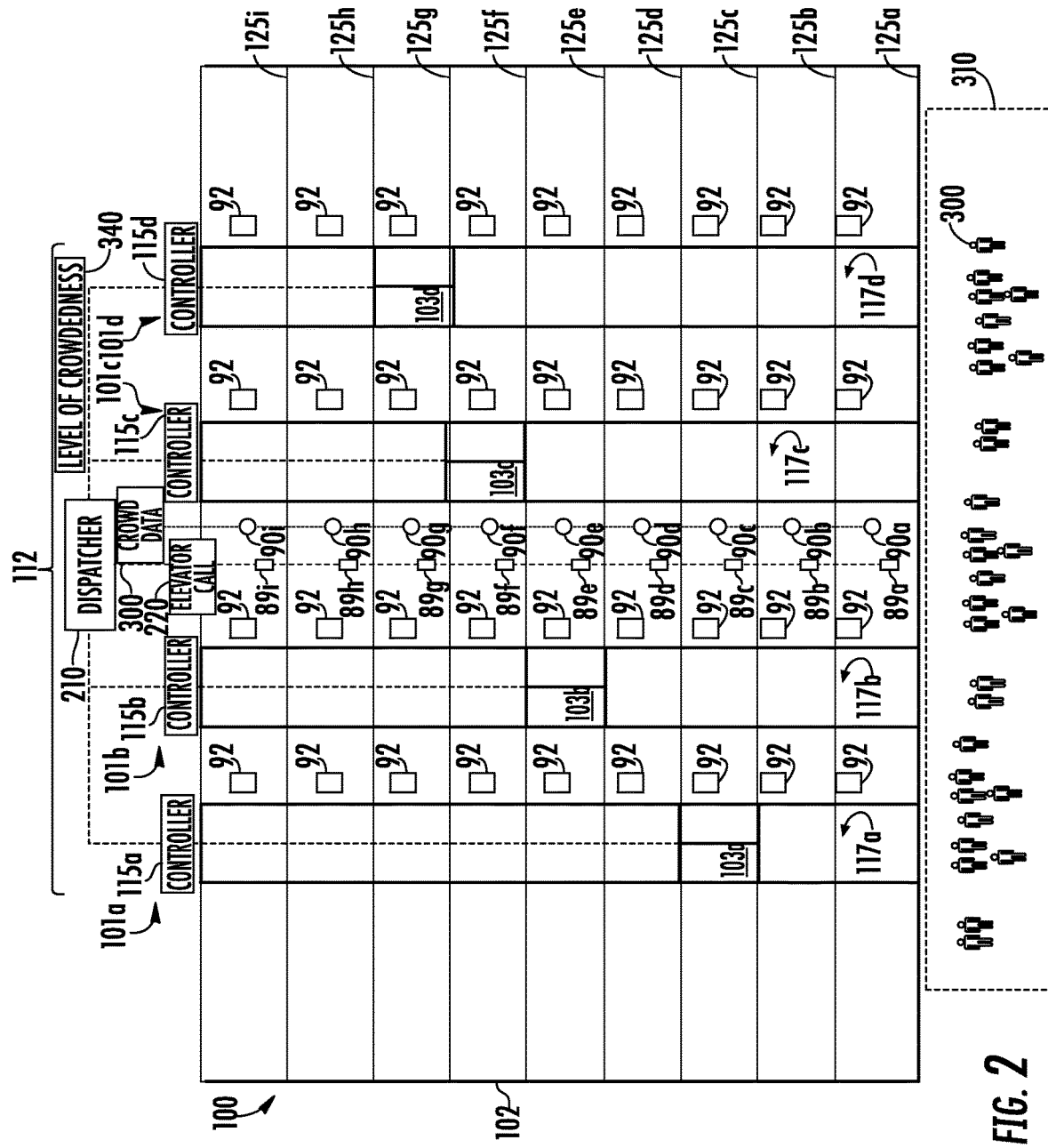
FIG. 2 illustrates a schematic view of a building elevator system, in accordance with an embodiment of the disclosure.

Referring now to FIG. 2 with continued reference to FIG. 1. As seen in FIG. 2, a building elevator system 100 within a building 102 may include multiple different individual elevator systems 101a-101d organized in an elevator group 112 (e.g., elevator banks). The elevator systems 101a-101d include a first elevator system 101a having an elevator car 103a, a second elevator system 101b having an elevator car 103b, a third elevator system 101c having an elevator car 103c, and a fourth elevator system 101d having an elevator car 103d. It is understood that while four elevator systems 101a-101d are utilized for exemplary illustration, embodiments disclosed herein may be applied to building elevator systems 100 having two or more elevator systems 101. It is also understood that while nine landings 125a-125i are utilized for exemplary illustration, embodiments disclosed herein may be applied to building elevator systems 100 having any number of landings.

Further, the elevator system 101a-101d illustrated in FIG. 2 is organized into a single elevator group 112 for ease of explanation but it is understood that the elevator systems 101a-101d may be organized into one or more elevator groups. The elevator group 112 may contain one or more elevator systems 101. The elevator group 112 serves a plurality of landings 125 comprising landings 125a-125i. It is understood that while the elevator group 112 serves every landing 125a-125i illustrated within the building 102 for exemplary illustration, embodiments disclosed herein may include elevator group having multiple elevator systems where each elevator system serves a different range of landings and not all the landings 125a-125i of the building 102.

Each landing 125a-125i in the building 102 of FIG. 2 may have an elevator call device 89a-89i. The elevator call device 89a-89i sends an elevator call 220 to the dispatcher 210 including the source of the elevator call 220. The elevator call device 89-89i may include a destination entry option that includes the destination of the elevator call 220. The elevator call device 89a-89i may be a push button and/or a touch screen and may be activated manually or automatically. For example, the elevator call 220 may be sent by an individual entering the elevator call 220 via the elevator call device 89a-89i. The elevator call device 89a-89i may also be activated to send an elevator call 220 by voice recognition or a passenger detection mechanism in the hallway, such as, for example a weight sensing device, a visual recognition device, depth sensing device, radar device, a laser detection device, and/or any other desired device capable of sensing the presence of a passenger. The elevator call device 89a-89i may be activated to send an elevator call 220 through an automatic elevator call system that automatically initiates an elevator call 220 when an individual is determined to be moving towards the elevator system in order to call an elevator or when an individual is scheduled to activate the elevator call device 89a-89i. The elevator call device 89a-89i may also be a mobile device configured to transmit an elevator call 220. The mobile device may be a smart phone, smart watch, laptop, or any other mobile device known to one of skill in the art.

The controllers 115a-115d can be combined, local, remote, cloud, etc. The dispatcher 210 may be local, remote, cloud, etc. The dispatcher 210 is in communication with the controller 115a-115d of each elevator system 101a-101d. Alternatively, there may be a controller 115 that is common to all of the elevator systems 101a-101d and controls all of the elevators system 101a-101d. The dispatchers 210 may be a 'group' software that is configured to select the best elevator car 103 assigned to the dispatcher 210. The dispatchers 210 manage the elevator call devices 89a-89i related to the elevator group 112.

The dispatcher 210 is configured to control and coordinate operation of multiple elevator systems 101a-101d. The dispatcher 210 may be an electronic controller including a processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

The dispatcher 210 is in communication with each of the elevator call devices 89a-89i of the building elevator system 100. The dispatcher 210 is configured to receive each elevator call 220 transmitted from the elevator call devices 89a-89i. The dispatcher 210 is configured to manage the elevators calls 220 coming in from each elevator call device 89a-89i and command one or more elevator systems 101a-101d to respond to elevator calls 220.

Each landing 125a-125i in the building 102 of FIG. 2 may also include a crowd detection device 90a-90i located proximate the elevator group 112 on each landing 125a-125i. The crowd detection device 90a-90i may include a camera. The crowd detection device 90a-90i is determined to detect crowd data 300 proximate the elevator systems 101a-101d and/or within an elevator lobby 310 proximate the elevator systems 101a-101d. An elevator lobby 310 is defined as an area located proximate the elevator system 101a-101d on each landing 125a-125i and is not limited to the landing 125a that is lowest, as illustrated in FIG. 2. The crowd data 300 may include number of individuals located in the elevator lobby 310 and a location of each of the individuals located in the elevator lobby 310 (e.g., what elevator system 101a-101d are the individuals near). A level of crowdedness 340 may be determined in response to the crowd data 300 detected. The level of crowdedness 340 may include a number of individuals 320, a concentration of individuals 320, a crowding score (e.g., a scale of one-to-ten with one being empty and ten being full), or any other desired metric for determining a rough approximation of the crowdedness 340. Individuals 320 being located proximate the elevator systems 101a-101d and/or within the elevator lobby 310 is indicative that the individuals 320 would like to board an elevator car 103a-103d of the elevator systems 101a-101d.

In one embodiment, the crowd detection device 90a-90i is able to detect crowd data 300 and determine a level of crowdedness 340 through image pixel counting. The crowd data 300 may include a current image of the elevator lobby 310 and a stock image of the elevator lobby 310. For example, the crowd detection device 90a-90i may utilize pixel counting by capturing a current image of the elevator lobby 310 and comparing the current image of the elevator lobby 310 to a stock image of the elevator lobby 310 that illustrates the elevator lobby 310 with zero individuals 320 present or a known number of individuals 320 present. The number of pixels that are different between the stock image of the elevator lobby 310 and the current image of the elevator lobby 310 may correlate with how crowded (i.e. the level of crowdedness 340) the elevator lobby 310 is with individuals 320. It is understood that the embodiments disclosed herein are not limited to pixel counting to determine a level of crowdedness 340 and thus a level of crowdedness 340 may be determined utilizing other method including but not limited to video analytics software. Video analytics may identify individuals 300 from stationary objections and count each individual separately to determine a total number of individuals 300.

The level of crowdedness 340 of the elevator lobby 310 may be determined using a machine learning, deep learning, and/or artificial intelligence module. The artificial intelligence module can be located in the crowd detection device 90a-90i or in a separate module in the elevator lobby 310 or on the landing 125. The separate module may be able to communication with the detection device 90a-90i and/or the dispatcher 210 to communicate the level of crowdedness 240 to the dispatcher 210. The level of crowdedness 340 of the elevator lobby 310 may be expressed in the crowd data 300 as a percentage from zero-to-one-hundred percent indicating what percentage of pixels have are different between the stock image of the elevator lobby 310 and the current image of the elevator lobby 310. The level of crowdedness 340 of the elevator lobby 310 may be expressed in the crowd data 300 as a scale of one-to-ten (e.g., one being empty and ten being full) indicating what percentage of pixels have are different between the stock image of the elevator lobby 310 and the current image of the elevator lobby 310. The level of crowdedness 340 of the elevator lobby 310 may be expressed in the crowd data 300 as a number of individuals 320, which may be determined in response to the number of pixels have that are different between the stock image of the elevator lobby 310 and the current image of the elevator lobby 310. It is understood that the level of crowdedness 340 of the elevator lobby 310 may be expressed as any other desired metric for determining a rough approximation of the crowdedness 340.

The crowd detection device 90a-90i may transmit the crowd data 300 to the dispatcher 210. The dispatcher 210 may analyze the crowd data 300 and determine a level of crowdedness 340 of the elevator lobby 310. Alternatively, the crowd detection device 90a-90i may determine a level of crowdedness 340 and transmit the level of crowdedness 340. In response to the level of crowdedness 340, the dispatcher 210 may determine whether an elevator car 103a-103d should be sent to the landing 125a-125i where the crowd data 300 was detected, how many elevator car 103a-103d should be sent to the landing 125a-125i where the crowd data 300 was detected, how fast each elevator car 103a-103b should be sent to the landing 125a-125i where the crowd data 300 was detected and/or when each elevator car 103a-103b should be sent (e.g., departure to and/or arrival at) to the landing 125a-125i where the crowd data 300 was detected. For example, if the elevator lobby 310 on a first landing 125a is showing a level of crowdedness 340 as "FULL" or "HALF FULL" in response to the crowd data 300, the dispatcher 210 may dispatch multiple elevator cars 103a-103d to arrive at the first landing 125a to clear the "FULL" or "HALF FULL" elevator lobby 310. The multiple elevator cars 103a-103d may be dispatched to arrive simultaneously at the first landing 125a or in a sequential order at the first landing 125a. Advantageously, conventional elevator systems do not have the ability to adjust the number of elevator cars 103a-103d that are sent to a landing 125a-125i in response to crowd data 300 from that landing 125a-125i. In conventional elevator systems, individuals must repeatedly press an elevator call button to request a single elevator car at a time.

Additionally, there may be a display device 92 on each landing 125a-125i to visually indicate how long (e.g., a countdown time) until each elevator car 103a-103d of each elevator system 101a-101d arrives at each landing 125a-125i. Advantageously, the display devices 92 will allow individuals 320 waiting in the elevator lobby 310 to know which elevator cars 103a-103d will arrive soon and thus the individuals can crowd around the correct elevator systems 101a-101d.

Figure 3:
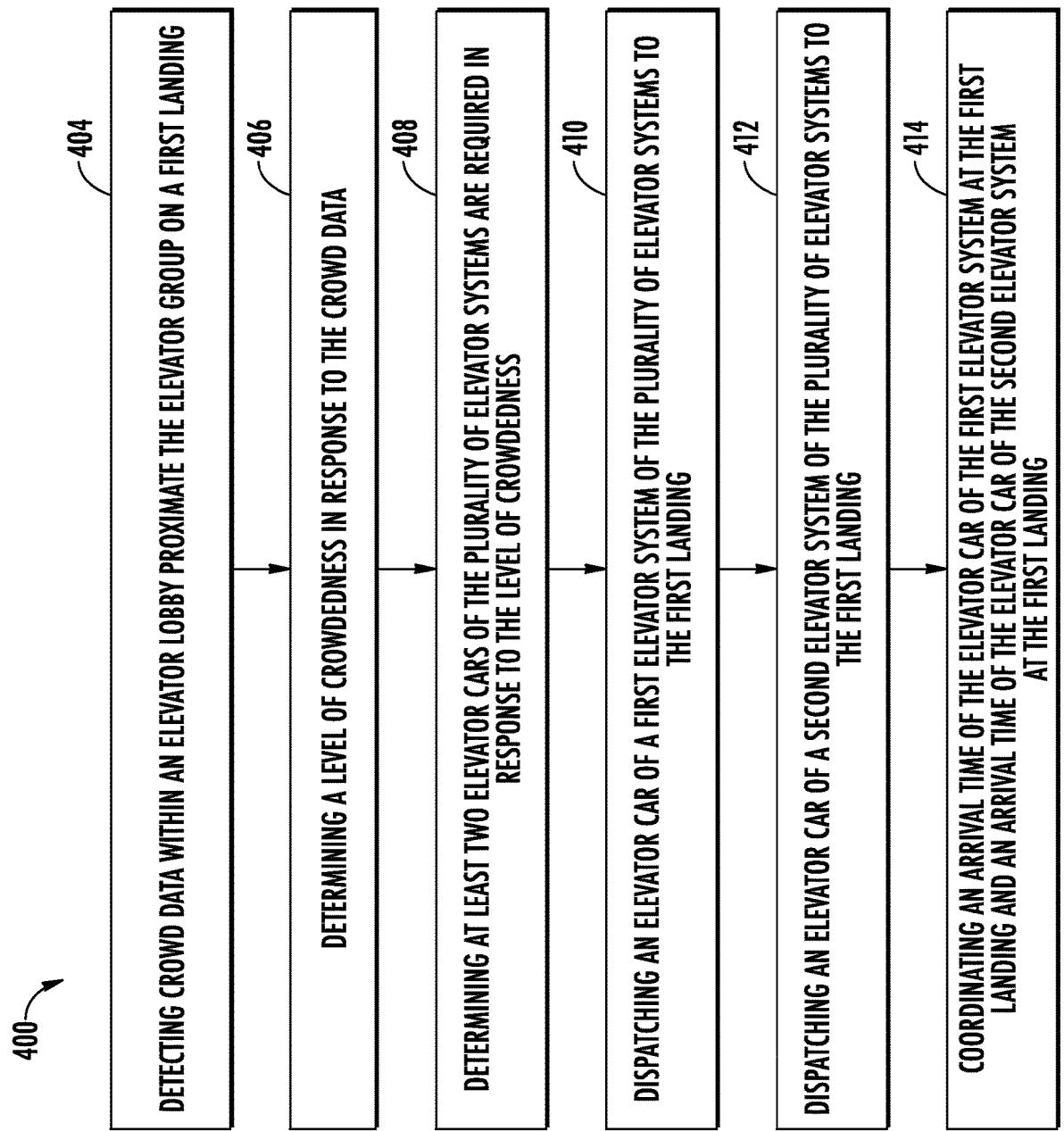
FIG. 3 is a flow chart of method of operating a building elevator system, in accordance with an embodiment of the disclosure.

Referring now to FIG. 3, while referencing components of FIGS. 1 and 2. FIG. 3 shows a flow chart of method 400 of operating a building elevator system 100 having a plurality of elevator systems 101a-101d organized into an elevator group 112, in accordance with an embodiment of the disclosure. In an embodiment, the method 400 may be performed by the dispatcher 210 and/or the crowd detection device 90a-90i.

At block 404, crowd data 300 is detected within an elevator lobby 310 proximate the elevator group 112 on a landing 125. An elevator lobby 310 is defined as an area located proximate the elevator system 101a-101d on each landing 125a-125i and is not limited to the landing 125a that is lowest, as illustrated in FIG. 2. At block 406, a level of crowdedness 340 is determined in response to the crowd data 300. In an embodiment, the level of crowdedness 340 is determined through image pixel counting. At block 408, it is determined that at least two elevator cars 103 of the plurality of elevator systems 101 are required in response to the level of crowdedness 340. For example, the level of crowdedness 340 may exceed a threshold level of crowdedness. The threshold level of crowdedness may represent the maximum number of individuals 300 a single elevator car 103 may carry or an optimized number of individuals 300 that a single elevator car 103 may carry. The optimized number of individuals 300 may be a number of individual 300 that would be better served by two elevator cars 103 rather than a single elevator car 103. At block 410, an elevator car 103a of a first elevator system 101a of the plurality of elevator systems 101 is dispatched to the landing 125. At block 412, an elevator car 103b of a second elevator system 101b of the plurality of elevator systems 101a-101d to the landing 125.

If there are more than two elevator systems 101 present in the building 102, then the dispatcher 210 may need to determine which two elevator systems 101 of the plurality of elevator systems 101a-101d will send elevator cars 103. For example, prior to dispatching the elevator car 103a of a first elevator system 101a and the elevator car 103b of a second elevator system 101b the method 400 further comprises: determining that the elevator car 103a of a first elevator system 101a is proximate the elevator car 103b of the second elevator system 101b, thus it would be advantageous to dispatch the elevator car 103a of a first elevator system 101a and the elevator car 103b of a second elevator system 101b. In another example, prior to dispatching the elevator car 103a of a first elevator system 101a and the elevator car 103b of a second elevator system 101b the method 400 further comprises: determining that the elevator car 103a of a first elevator system 101a and the elevator car 103b of the second elevator system 101b are located proximate the landing 125 where the elevator call 20 originated, thus it would be advantageous to dispatch the elevator car 103a of a first elevator system 101a and the elevator car 103b of a second elevator system 101b.

At block 414, an arrival time of the elevator car 103a of the first elevator system 101a at the landing 125 is coordinated with an arrival time of the elevator car 103 of the second elevator system 101b at the landing. The arrival time of the elevator car 103a of the first elevator system 101a at the landing 125 may be coordinated with an arrival time of the elevator car 103 of the second elevator system 101b at the landing 125 such that the arrival time of the elevator car 103a of the first elevator system 101a at the landing 125 is approximately equivalent to the arrival time of the elevator car 103b of the second elevator system 101b at the landing 125. The arrival time of the elevator car 103a of the first elevator system 101a at the landing 125 may be coordinated with an arrival time of the elevator car 103 of the second elevator system 101b at the landing 125 such that the arrival time of the elevator car 103a of the first elevator system 101a at the landing 125 is before the arrival time of the elevator car 103b of the second elevator system 101b at the landing 125. The arrival time of the elevator car 103a of the first elevator system 101a at the landing 125 may be coordinated with an arrival time of the elevator car of the second elevator system at the landing 125 such that the arrival time of the elevator car 103a of the first elevator system 101a at the landing 125 is after the arrival time of the elevator car 103b of the second elevator system 101b at the landing 125. The crowd data 300 may also include a location of individuals in the elevator lobby 310 and the dispatcher may coordinate the arrival time of the elevator car 103a of the first elevator system 101a at the landing 125 with the arrival time of the elevator car 103 of the second elevator system 101b at the landing 125 based upon the location of the individuals 300. For example, based on the crowd location, the dispatcher 210 might open furthest elevator car 103 first so that individuals 300 waiting to board a closer elevator car 103 do not block other individuals 300 trying to board the further elevator car 103.

The coordination at block 414 may be accomplished by adjusting at least one of a velocity of the elevator car 103a of the first elevator system 101a and a velocity of the elevator car 103b of the second elevator system 101b. In one example, the velocity of the elevator car 103a of the first elevator system 101a is increased and the velocity of the elevator car 103b of the second elevator system 101b is decreased. In another example, the velocity of the elevator car 103a of the first elevator system 101a is decreased and the velocity of the elevator car 103b of the second elevator system 101b is increased. The coordination at block 414 may also be accomplished by adjusting at least one of a dispatch time of the elevator car 103a of the first elevator system 101a and a dispatch time of the elevator car 103b of the second elevator system 101b.

The method 400 may further include that the arrival time of the elevator car 103a of the first elevator system 101a at the landing 125 is displayed on a display device 92 located on the landing 125 and the arrival time of the elevator car 103b of the second elevator system 101b at the landing 125 is displayed on a second display device 92 located on the landing 125.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of operating a building elevator system having a plurality of elevator systems organized into an elevator group, the method comprising:
  detecting crowd data within an elevator lobby proximate the elevator group on a landing;
  determining a level of crowdedness in response to the crowd data;
  determining at least two elevator cars of the plurality of elevator systems are required in response to the level of crowdedness;
  dispatching an elevator car of a first elevator system of the plurality of elevator systems to the landing;
  dispatching an elevator car of a second elevator system of the plurality of elevator systems to the landing; and
  coordinating an arrival time of the elevator car of the first elevator system at the landing and an arrival time of the elevator car of the second elevator system at the landing.

2. The method of claim 1, further comprising:
adjusting at least one of a velocity of the elevator car of the first elevator system and a velocity of the elevator car of the second elevator system.

3. The method of claim 1, wherein prior to dispatching the elevator car of the first elevator system and the elevator car of the second elevator system, the method further comprises:
determining the elevator car of the first elevator system is proximate the elevator car of the second elevator system.

4. The method of claim 1, wherein prior to dispatching the elevator car of the first elevator system and the elevator car of the second elevator system, the method further comprises:
determining the elevator car of the first elevator system and the elevator car of the second elevator system are proximate the landing.

5. The method of claim 1, further comprising:
adjusting at least one of a dispatch time of the elevator car of the first elevator system and a dispatch time of the elevator car of the second elevator system.

6. The method of claim 1, wherein the arrival time of the elevator car of the first elevator system at the landing is equivalent to the arrival time of the elevator car of the second elevator system at the landing.

7. The method of claim 1, wherein the crowd data includes a location of individuals within an elevator lobby, and wherein the arrival time of the elevator car of the first elevator system at the landing and the arrival time of the elevator car of the second elevator system at the landing are coordinated in response to the location of individuals within the elevator lobby.

8. The method of claim 1, wherein the arrival time of the elevator car of the first elevator system at the landing is before the arrival time of the elevator car of the second elevator system at the landing.

9. The method of claim 1, wherein the arrival time of the elevator car of the first elevator system at the landing is after the arrival time of the elevator car of the second elevator system at the landing.

10. The method of claim 1, further comprising:
displaying the arrival time of the elevator car of the first elevator system at the landing on a display device located on the landing; and
displaying the arrival time of the elevator car of the second elevator system at the landing on a second display device located on the landing.

11. A building elevator system having a plurality of elevator systems organized into an elevator group, the building elevator system comprising:
a processor;
a memory comprising computer-executable instructions that, when executed by the processor, cause the processor to perform operations, the operations comprising:
detecting crowd data within an elevator lobby proximate the elevator group on a landing;
determining a level of crowdedness in response to the crowd data;
determining at least two elevator cars of the plurality of elevator systems are required in response to the level of crowdedness;
dispatching an elevator car of a first elevator system of the plurality of elevator systems to the landing;
dispatching an elevator car of a second elevator system of the plurality of elevator systems to the landing; and
coordinating an arrival time of the elevator car of the first elevator system at the landing and an arrival time of the elevator car of the second elevator system at the landing.

12. The building elevator system of claim 11, wherein the operations further comprise:
adjusting at least one of a velocity of the elevator car of the first elevator system and a velocity of the elevator car of the second elevator system.

13. The building elevator system of claim 11, wherein prior to dispatching the elevator car of the first elevator system and the elevator car of the second elevator system, the operations further comprises:
determining the elevator car of the first elevator system is proximate the elevator car of the second elevator system.

14. The building elevator system of claim 11, wherein prior to dispatching the elevator car of the first elevator system and the elevator car of the second elevator system, the operations further comprises:
determining the elevator car of the first elevator system and the elevator car of the second elevator system are proximate the landing.

15. The building elevator system of claim 11, wherein the operations further comprise:
adjusting at least one of a dispatch time of the elevator car of the first elevator system and a dispatch time of the elevator car of the second elevator system.

16. The building elevator system of claim 11, wherein the arrival time of the elevator car of the first elevator system at the landing is equivalent to the arrival time of the elevator car of the second elevator system at the landing.

17. The building elevator system of claim 11, wherein the crowd data includes a location of individuals within an elevator lobby, and wherein the arrival time of the elevator car of the first elevator system at the landing and the arrival time of the elevator car of the second elevator system at the landing are coordinated in response to the location of individuals within the elevator lobby.

18. The building elevator system of claim 11, wherein the arrival time of the elevator car of the first elevator system at the landing is before the arrival time of the elevator car of the second elevator system at the landing.

19. The building elevator system of claim 11, wherein the arrival time of the elevator car of the first elevator system at the landing is after the arrival time of the elevator car of the second elevator system at the landing.

20. The building elevator system of claim 11, wherein the operations further comprise:
displaying the arrival time of the elevator car of the first elevator system at the landing on a display device located on the landing; and
displaying the arrival time of the elevator car of the second elevator system at the landing on a second display device located on the landing.

* * * * *